INVENTORS
JOHN COCKE
CHARLES V. FREIMAN
MERLE E. HOMAN
BY Roy R. Schlemmer, Jr.
ATTORNEY Sept. 8, 1970 J. COCKE ET AL 3,527,930

HIGH SPEED DIVISION SYSTEM

Filed July 19, 1967 19 Sheets-Sheet 5

Sept. 8, 1970 J. COCKE ET AL 3,527,930

HIGH SPEED DIVISION SYSTEM

Filed July 19, 1967 19 Sheets-Sheet 6

Sept. 8, 1970 J. COCKE ET AL 3,527,930

HIGH SPEED DIVISION SYSTEM

Filed July 19, 1967 19 Sheets-Sheet 8

FIG. 8A

| DEVICE 126 | | |
|---|---|---|
| LEFT-HAND INPUT | TOP INPUT | OUTPUT |
| 0 | 0 | 0 |
| 0 | 1 | 1 |
| 0 | 2 | 2 |
| 1 | 0 | 2 |
| 1 | 1 | 0 |
| 1 | 2 | 1 |
| 2 | 0 | 1 |
| 2 | 1 | 2 |
| 2 | 2 | 0 |

FIG. 8B

| DEVICE 128 | | |
|---|---|---|
| LEFT-HAND INPUT | TOP INPUT | OUTPUT |
| 0 | 0 | 0 |
| 0 | 1 | 1 |
| 0 | 2 | 2 |
| 1 | 0 | 1 |
| 1 | 1 | 2 |
| 1 | 2 | 0 |
| 2 | 0 | 2 |
| 2 | 1 | 0 |
| 2 | 2 | 1 |

FIG. 8C

| DEVICE 130 | |
|---|---|
| INPUT | OUTPUT |
| 0 | 0 |
| 1 | 0 |
| 2 | 0 |
| 3 | 1 |
| 4 | 1 |
| 5 | 1 |
| 6 | 2 |
| 7 | 2 |

FIG. 8D

| DEVICE 132 | |
|---|---|
| INPUT | OUTPUT |
| 0 | 0 |
| 1 | 0 |
| 2 | 0 |
| 3 | 1 |
| 4 | 1 |
| 5 | 1 |
| 6 | 2 |
| 7 | 2 |
| 10 | 2 |
| 11 | 3 |
| 12 | 3 |
| 13 | 3 |
| 14 | 4 |
| 15 | 4 |
| 16 | 4 |
| 17 | 5 |
| 20 | 5 |
| 21 | 5 |
| 22 | 6 |
| 23 | 6 |
| 24 | 6 |
| 25 | 7 |
| 26 | 7 |
| 27 | 7 |

FIG. 9A
RADIX = 10, DIVISOR = 7
FIG. 9
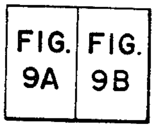
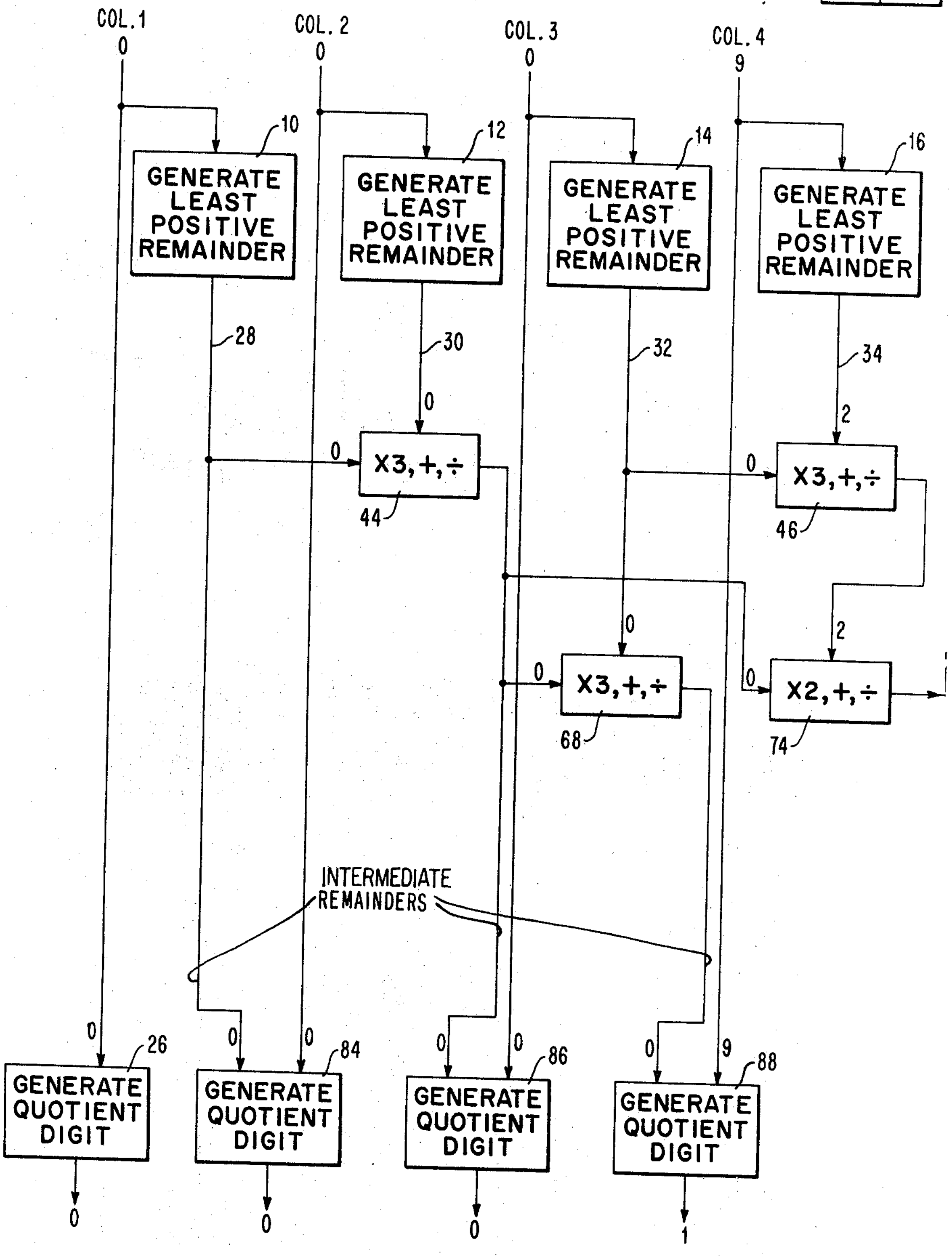

RADIX = 10, DIVISOR = 7

FIG. 10A
RADIX = 8 , DIVISOR = 7
FIG. 10
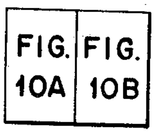
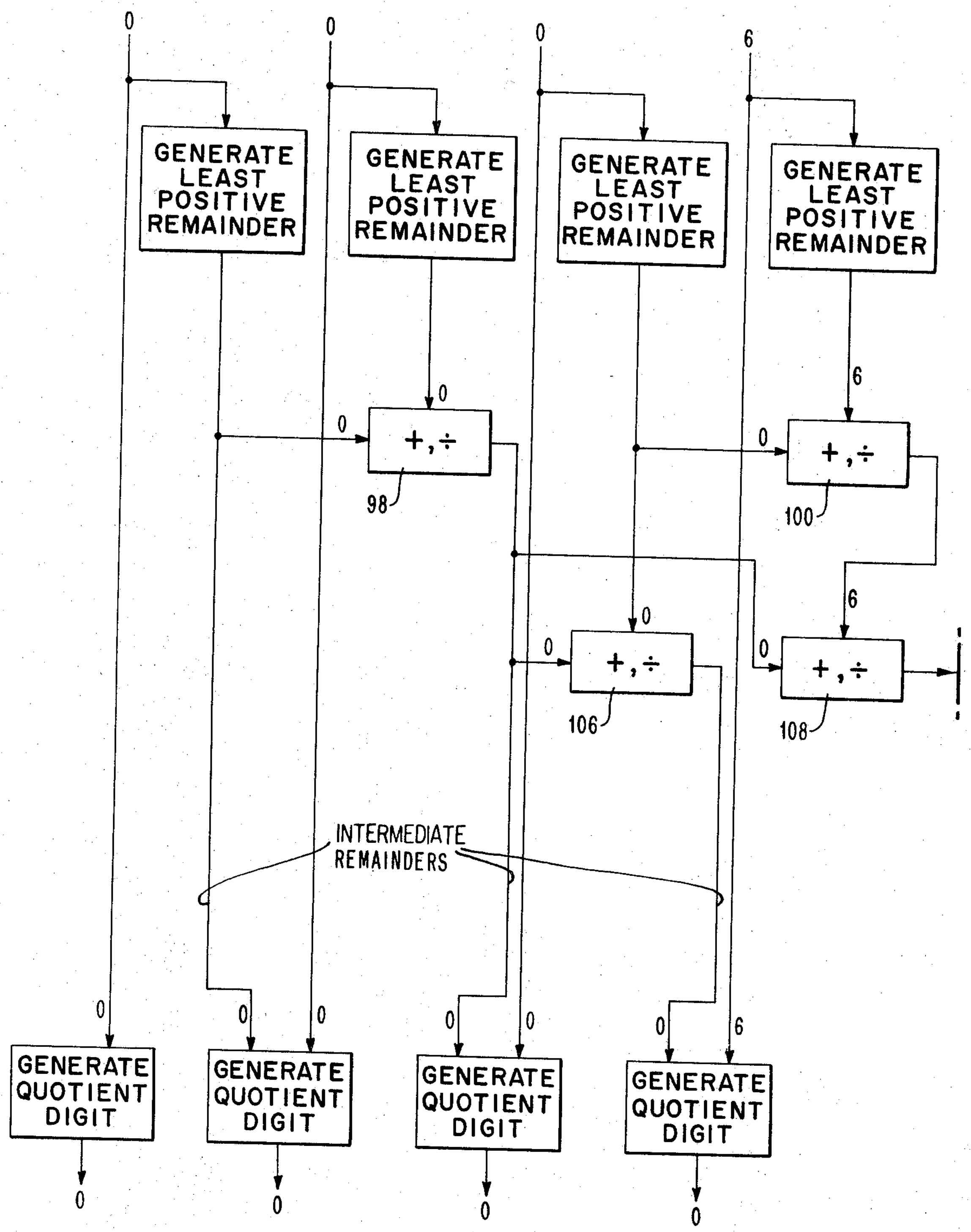

RADIX = 8 , DIVISOR = 7

RADIX = 10 DIVISOR = 5

FIG. 12A
RADIX = 8 , DIVISOR = 3
FIG .12
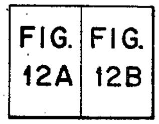
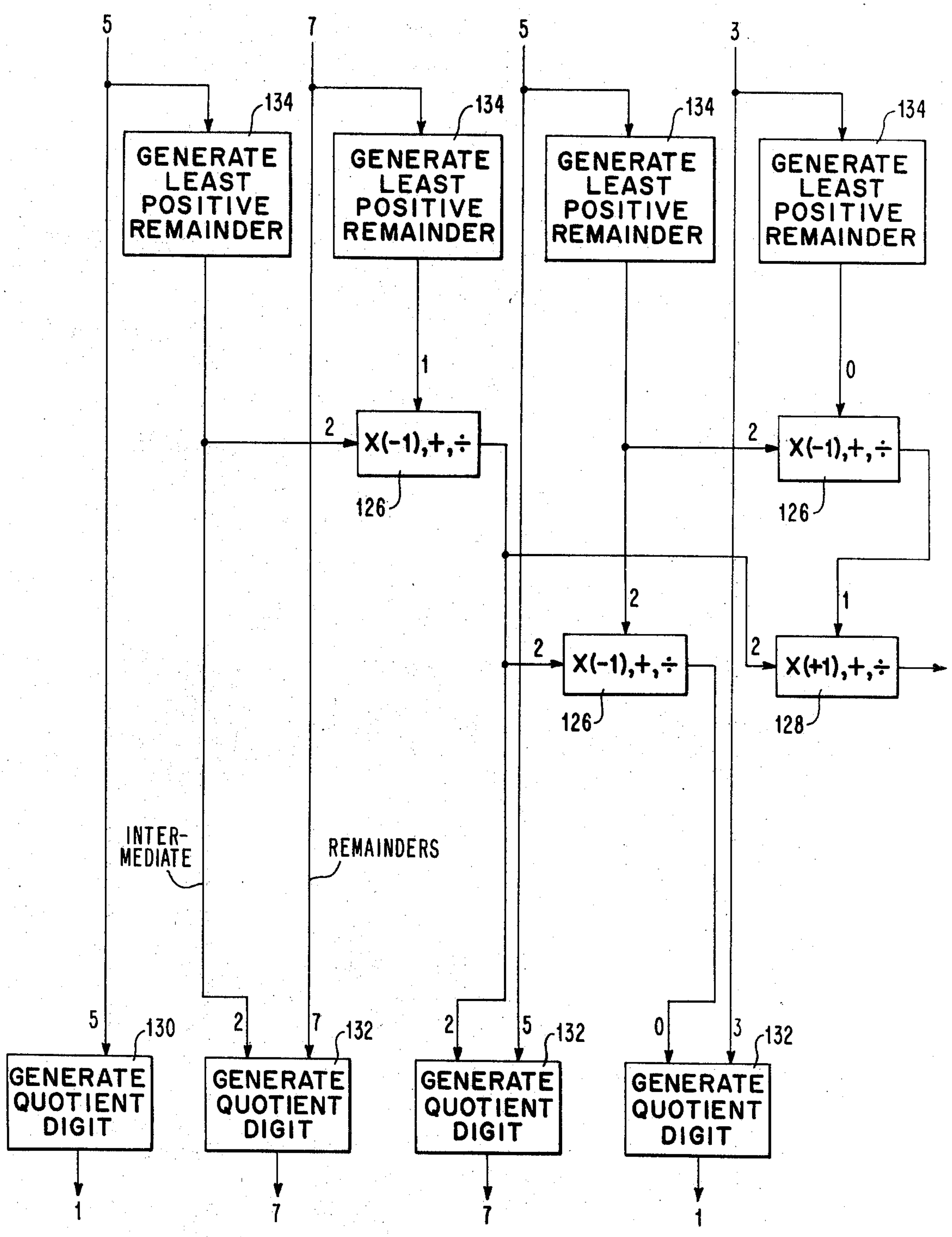

RADIX = 8 , DIVISOR = 3

United States Patent Office 3,527,930
Patented Sept. 8, 1970

3,527,930

HIGH SPEED DIVISION SYSTEM

John Cocke, Menlo Park, Charles V. Freiman, Los Altos, and Merle E. Homan, Los Gatos, Calif., assignors to International Business Machines Corporation, Armonk, N.Y., a corporation of New York Filed July 19, 1967, Ser. No. 654,579
Int. Cl. G06f *7/38, 7/44*
U.S. Cl. 235—160 11 Claims

ABSTRACT OF THE DISCLOSURE

A system for performing high speed division of an essentially fixed divisor type. The system includes means for developing remainders in a highly parallel fashion wherein once the interdigit remainders have been developed, the complete integer quotient may be generated for all digit positions substantially concurrently with the generation of the final remainder.

BACKGROUND OF INVENTION

The present invention relates to a system for performing highly parallel high speed division. It has particular utility for memory address generation purposes. In most present day high speed memories especially of the three dimension core storage type virtually all address decoding is done on a power of 2 basis, i.e., 2, 4, 8, 16, 32, etc. This applies to both the XY addressing and also to situations where a plurality of individual data words are included within a single memory word. Thus, in a memory word of, for example, 64 bits there might be two data words of 32 bits each or 4 data words of 16 bits each. In such systems it is conventional to give a single address of the desired data word from which the memory word address may be decoded together with the relative position of the desired data word within the memory word. Assuming, for example, that an address of 430 were given for a desired data word in a memory organized having four data words per memory word, this address 430 written in binary form could be decoded to find the proper memory address of 107 by merely shifting the binary address to the right two bit positions as will be understood by those skilled in the art. Further the particular data word designated by the address 430 would be the third data word stored at the memory word location designated by the address 107. Individual memory word addresses and data word addresses within the particular memory word may thus be easily decoded for memory organizations wherein the number of data words are a power of 2, as stated previously, by merely shifting the single data word address provided to the system. However, as may well be appreciated this power of 2 data word organization is not necessarily convenient. In the past, due to the complexity and time involved in performing division of an address by conventional means, i.e., performing the division one digit at a time beginning with the highest order digit generating a quotient and a remainder and rippling the remainder down to the next highest order digit and reperforming the division is quite time consuming and hence has not been seriously considered in previous memory accessing systems.

Modern day computer technology especially in the areas of memory design and fabrication are allowing ever larger numbers of bits to be concurrently accessed in a single memory fetch. For example, in certain IBM 360 models, as many as 288 bits may be accessed per memory cycle. It is also entirely possible in the near future that this number of bits per access may be significantly increased. It may thus readily be seen that limiting the number of data words within such a large access to a power of 2, i.e., 2, 4, 8, 16, etc. is quite limiting on a system design wherein it is desired to achieve maximum utilization of memory storage capabilities.

SUMMARY OF INVENTION AND OBJECTS

It has now been found that a specialized hardware system is capable of performing certain types of fixed divisor operations in a greatly improved manner by providing a high degree of look-ahead in the remainder circuitry. The disclosed system, while useful in any environment wherein fixed divisor division problems are present, has particular utility in address decoding circuitry for use with memories capable of accessing up to W words per access wherein W is not a power of 2 and thus cannot be decoded by mere truncation of low order bits or by shifting. Use of the present division scheme thus allows a much more flexible design of memory systems wherein the number of words per memory access may be altered by changing a relatively small quantity of hardware in the address decoding circuitry.

It is accordingly a primary object of the present invention to provide a very high speed division circuit.

It is a further object to provide such a circuit for use in the address decoding portion of a memory control system.

It is a still further object of the invention to provide such a high speed division circuit having a high degree of parallelism in remainder generation from the highest to the lowest order bits of an input dividend.

It is yet another object to provide such a division circuit having separate functional units for generating the integer portions of the quotient and the remainder.

Other objects and advantages of the present invention will be apparent from the following description of a preferred embodiment of the invention as set forth in the specification and drawings.

BRIEF DESCRIPTION OF DRAWINGS

FIGS. 8A–8D are truth tables for the indicated devices on FIGS. 2(A–D) and 12(A–B).

FIGS. 9A and 9B comprise a combination flow chart and numerical example using a dividend of radix 10 and a fixed divisor of 7.

FIGS. 10A and 10B comprise a combined flow chart and numerical example for a division circuit utilizing a dividend of radix 8 and fixed divisor of 7.

FIGS. 12A and 12B comprise a combined flow chart and numerical example for a preferred embodiment of the invention with a dividend of radix 8 and a fixed divisor of 3.

DESCRIPTION OF DISCLOSED EMBODIMENTS

Figure 1:
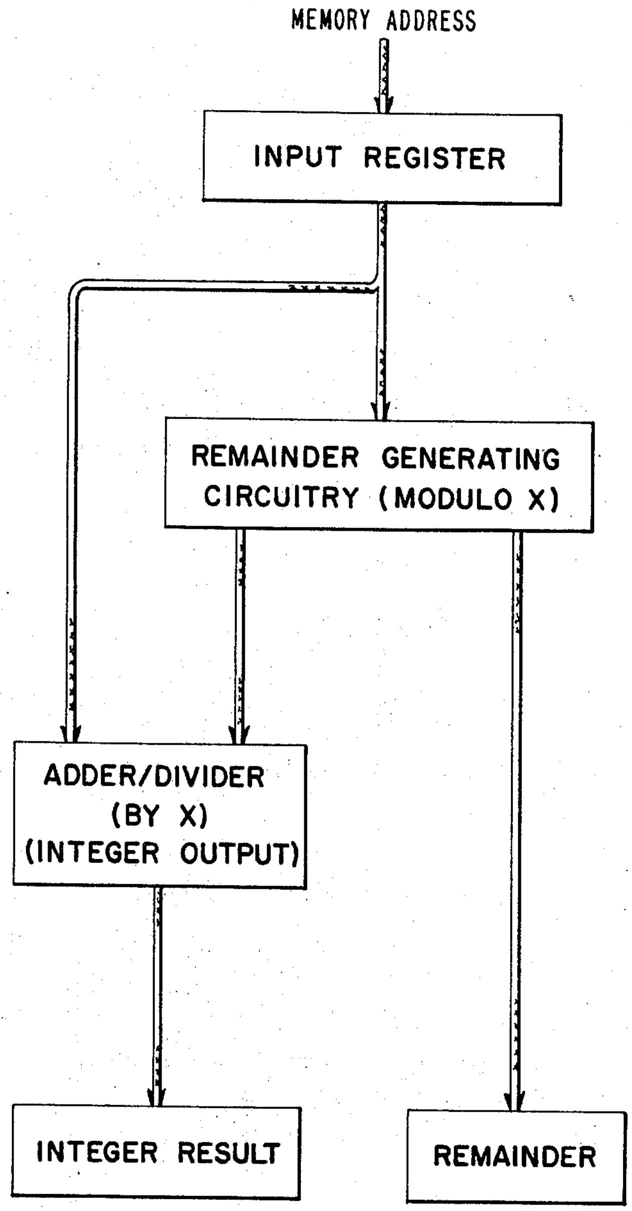
FIG. 1 is a generalized functional block diagram of the present division circuit.

The objects of the present invention are accomplished in general by a high speed division system for dividing a multiple digit dividend by a fixed divisor. The system includes a quotient digit generating stage associated with each digit of said dividend except the highest order digit. Each said quotient generating stage includes a remainder generating portion and a divider. The divider includes means for generating an effective dividend by combining the original dividend digit with the effective remainder from all higher order stages as determined by said remainder generating portion. A separate divider having no remainder input is provided for said highest order dividend digit and a remainder generating portion is provided to generate the final remainder.

By utilizing the present division system, the interdigit remainders and the final remainder are generated substantially in parallel and the final division to obtain each quotient digit which requires the combining of the particular dividend digit involved with a remainder quantity representing all higher order digits and dividing this result by the divisor may likewise be done in parallel. By further utilizing the particular numerical characteristics of the radix used in the system together with the fixed divisor, a number of additional savings in hardware and thus time may be obtained. Illustrations of such design modification based on the particular numerical system as utilized will be apparent from the subsequent description of the numerical examples.

As stated previously, such a system has particular utility in the generation of memory word and data word addresses in non standard systems, or where, for example, the number of data words contained in a single memory word would not be a power of 2 and wherein the memory word address would thus not be obtainable by simply shifting or truncating the system address.

However, before proceeding with a description of the preferred embodiment of the present invention as exemplified in the drawing of FIGS. 2 (A–D) a description of a memory system having an odd number of data words in each memory word will be described and subsequently thereto a number of numerical examples utilizing different radices and different fixed divisors will be specifically set forth and described.

Figure 7A:
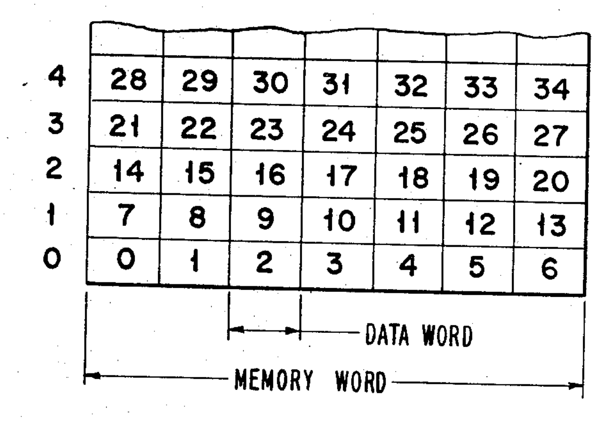
FIG. 7A is a diagrammatic representation of a section of a large computer memory wherein each memory word has a plurality of data words stored therein.

An example of a memory with a memory word equal to seven data words is shown in FIG. 7A.

The memory words are numbered 0, 1, 2, 3, 4, etc. at the left of the figure and the data words are specified by the numbers appearing within the rectangles. When a data word is called for it is necessary to divide the total memory address of the specified data word by seven. The quotient will be the address of the memory word and the remainder digit will be the address of the data word within the memory word. The address of the data word within the memory word is indicated as 0 through 6 with 0 at the left of the figure. For example, if data word 0 is called for, 0 is divided by 7 which gives a quotient of 0 and a remainder of 0. Thus, the memory word 0 will be addressed and the "0" position within this word will be the desired data word. If the data word 24 is called for, 24 is divided by 7 which gives a quotient of 3 and a remainder of 3. In this case the memory word 3 will be addressed and the addressed and the desired data word will be in the "3" position of the memory word.

A typical example might be as shown below. The address of the data word is taken as 92466.

```
     7|9   2    4    6    6
       1
   =7|9(2)2    4    6    6
       1   3
   =7|9    2(1)4    6    6
       1   3    2
   =7|9    2    4(0)6    6
       1   3    2    0
   =7|9    2    4    6(6)6
       1   3    2    0    9   +3/7
   =7|9    2    4    6    6
```

The above example shows how one might sequentially perform the simple division:

$$\frac{92466}{7}=13209+3/7$$

by inspection. Note, however, that if all of the intermediate remainders (in parentheses) are known initially, it is possible to generate the quotient digits in the following manner.

$$\left[\frac{(0)9}{7}\right]\left[\frac{(2)2}{7}\right]\left[\frac{(1)4}{7}\right]\left[\frac{(0)6}{7}\right]\left[\frac{(6)6}{7}\right]=13209$$

The symbol [ ] denotes "integer part of."

It will now be shown how these intermediate remainders can be obtained.

Figure 9B:
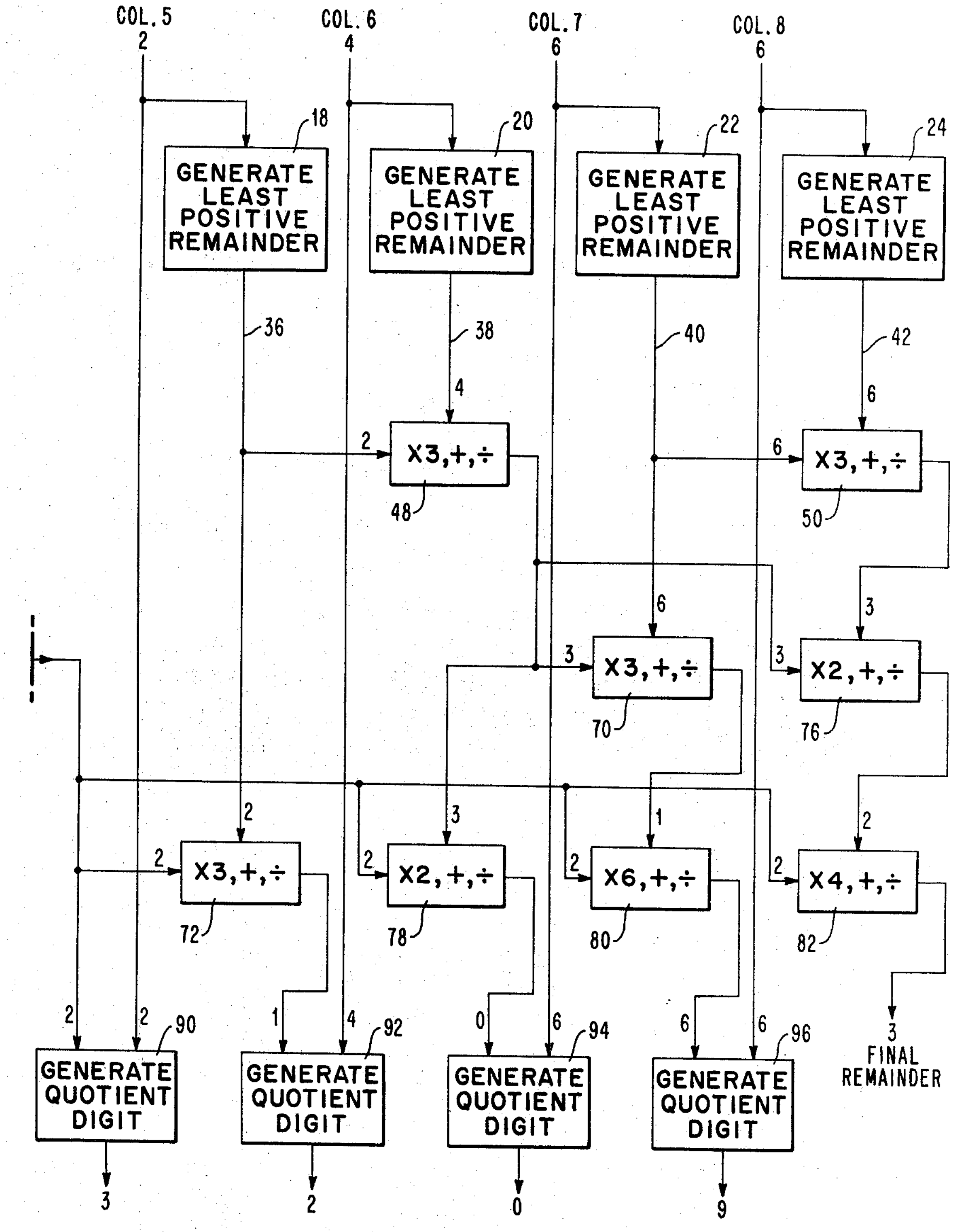

FIG. 9 shows a block diagram of a typical address generation divider organized in accordance with the teachings of the present invention which is capable of performing the division example referred to above by pregenerating or providing remainder look ahead hardware for determining all possible higher order remainders which would affect the final quotient integer for a particular dividend digit. As stated previously, a number of different radices or bases and different divisors are illustrated. This system is a radix 10, fixed divisor of 7 system. An eight column device is shown and the dividend, if it contains less than eight significant digits must be "right adjusted." In other words the low order significant digit must line up with the rightmost column of the device.

Figure 7B:
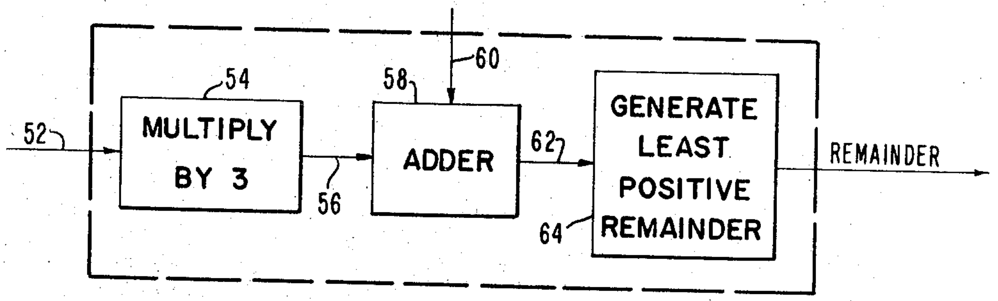
FIG. 7B is a functional block diagram of block 44 on FIGS. 9A and 9B.

The dividend is applied to the devices 10 to 24 inclusive. Devices 10 to 24 are one digit dividers or subtractors which produce remainder digits on lines 28 to 42 respectively. The remainder digits in this example, can vary from 0 to 6. The devices 44 to 50 inclusive are shown in detail in FIG. 7B.

The digit coming in at the left on line 52 is multiplied by 3 by the multiplier 54 and the product appears on line 56, which is one input to the adder 58. The reason a multiplier of 3 is used here is explained subsequently. The input on line 52 can be any digit from 0 to 6 and therefore the number on line 56 can be 0, 3, 6, 9, 12, 15 or 18.

The digit coming in at the top on line 60 can be any digit from 0 to 6. The output of the adder can obviously be any number from 0 to 24. Devices 68, 70 and 72 are the same as devices 40 to 50 inclusive.

Devices 74, 76 and 78 are the same as those just described except that the digit coming in at the left is multiplied by 2 instead of 3, which is also explained subsequently. It will be noted that the output of device 44 becomes the left hand input of both devices 68 and 74. The output of device 44 extends one column to the right to become the left hand input of device 68 and two columns to the right to become the left hand input of device 74. Because of this difference in the columns spanned, the multiplier factor of 3 in device 68 represents a quantity, i.e., the radix with sevens casts out, raised to its first power and the multiplier factor of 2 in device 74 represents the same quantity raised to its second power and sevens cast out, i.e., $$(10-7)^2=3^2$$
$$3^2=9$$
$$9-7=2$$

The power is the same as the number of columns spanned by the left hand input. It will be noted that the left hand input to device 80 spans three columns and that the multiplier 6 is the above-mentioned quantity raised to its third power with sevens cast out, i.e., $$(10-7)^3=3^3$$
$$3^3=27$$
$$27-(7\times3)=6$$

The "quantity" referred to in the above description is, of course, 3 which is the least positive remainder obtained when the radix 10 is divided by the fixed divisor 7.

Referring to FIG. 9(A and B) the generation of the intermediate remainders for the example chosen will be explained in detail. In all of the FIGS. 9–12 the numerals at the top of the figures represent the actual dividend digits and the numbers without lead lines appearing at the inputs to the various functional blocks represent the actual numerical values appearing on these lines for the indicated examples. In FIG. 9 the columns are numbered from left to right. The dividend digit for column 1 is 0 and therefore the intermediate remainder for column 2 is 0. The same is true for column 3 and column 4. The dividend digit for column 4 is 9. Device 16 will have an output on line 34 of 2 (9—7). The 2 will be transmitted unchanged through device 46 because the lefthand input to 46 is 0 and because no sevens can be extracted from 2. The output of device 46 becomes the top input for device 74 and again the 2 is transmitted unchanged and becomes the intermediate remainder for column 5.

In column 5, the dividend digit 2 is unchanged by device 18 because it does not contain a seven. The output of 18 becomes the top input for device 72. As the left hand input to 72 is 2, this is multiplied by 3 to give 6 which is added to 2 (top input) to give 8. One seven can be subtracted from 8 and the intermediate remainder for column 6 is 1.

The dividend digit for column 6 is 4 which is passed unchanged by device 20 and applied as the top input for device 48. The left hand input of device 48 is 2 which, multiplied by 3, becomes 6 and, added to 4, becomes 10. Device 48 will have an output of 3 (10—7) which is applied as the top input to device 78. The left hand input to device 78 is 2 which, multiplied by 2, becomes 4 and, added to 3, becomes 7. Exactly one seven is contained in 7 so the output of device 78 will be 0 and this is the intermediate remainder for column 7.

The dividend digit for column 7 is 6 which is transmitted unchanged by device 22 to become the top input for device 70. The left hand input for device 70 is 3 which, multiplied by 3, becomes 9 and, added to 6, becomes 15. Two sevens (14) are contained in 15 and thus, the output of device 70 is 1 and this becomes the top input for device 80. The left input for device 80 is 2 which, multiplied by 6, becomes 12 and, added to 1, becomes 13. There is one seven in (13) and thus the intermediate remainder for column 8 is 6 (13—7).

The final remainder for the division problem is generated by the devices in column 8. The dividend digit is 6 which is passed unchanged by device 24 to become the top input to device 50. The left hand input to device 50 is multiplied by 3 to become 18 and, added to 6, becomes 24. Three sevens (21) are contained in 24 and thus the output of device 50 is 3, i.e. (24—21). In device 76 the left hand input (3) is multiplied by 2 to become 6 which, added to the top input of 3, becomes 9. One seven is contained in 9 and thus the output of device 76 is 2 (9—7). In device 82 the left hand input (2) is multiplied by 4.

The number 4 is arrived at by raising 3 to its fourth power (four columns spanned) and casting out sevens.

$$(10-7)^4=3^4$$
$$3^4=81$$
$$81-(7\times11)=4$$

to become 8 which added to 2 (top input) becomes 10. One seven is contained in 10 and thus the final remainder or data word address is 3. In this manner, the intermediate and final remainders are produced.

It is next necessary to generate the quotient digits. This is done by the devices 84 to 96 inclusive in addition to the device 26. Device 26 must have the ability to extract one seven only from the high order dividend digit. Devices 84 to 96 inclusive must have the ability to extract up to nine sevens from the two digit number presented to them. This two digit number can range from 00 to 69.

The operation of the devices 84 to 96 is apparent from an examination of FIG. 9. Devices 84 and 86 having zero remainder and dividend digit inputs produce an output of zero. Device 88 has a zero remainder but a 9 digit input to produce a quotient digit of 1. Similarly, devices 90, 92, 94 and 96 have inputs of 22, 14, 06, and 66 respectively to produce quotient digits of 3, 2, 0, and 9. As will be apparent the devices 26 and 84 through 96 produce an integer in their output corresponding to the number of sevens cast out, i.e. they divide by seven producing the integer only in their output.

Figure 10B:
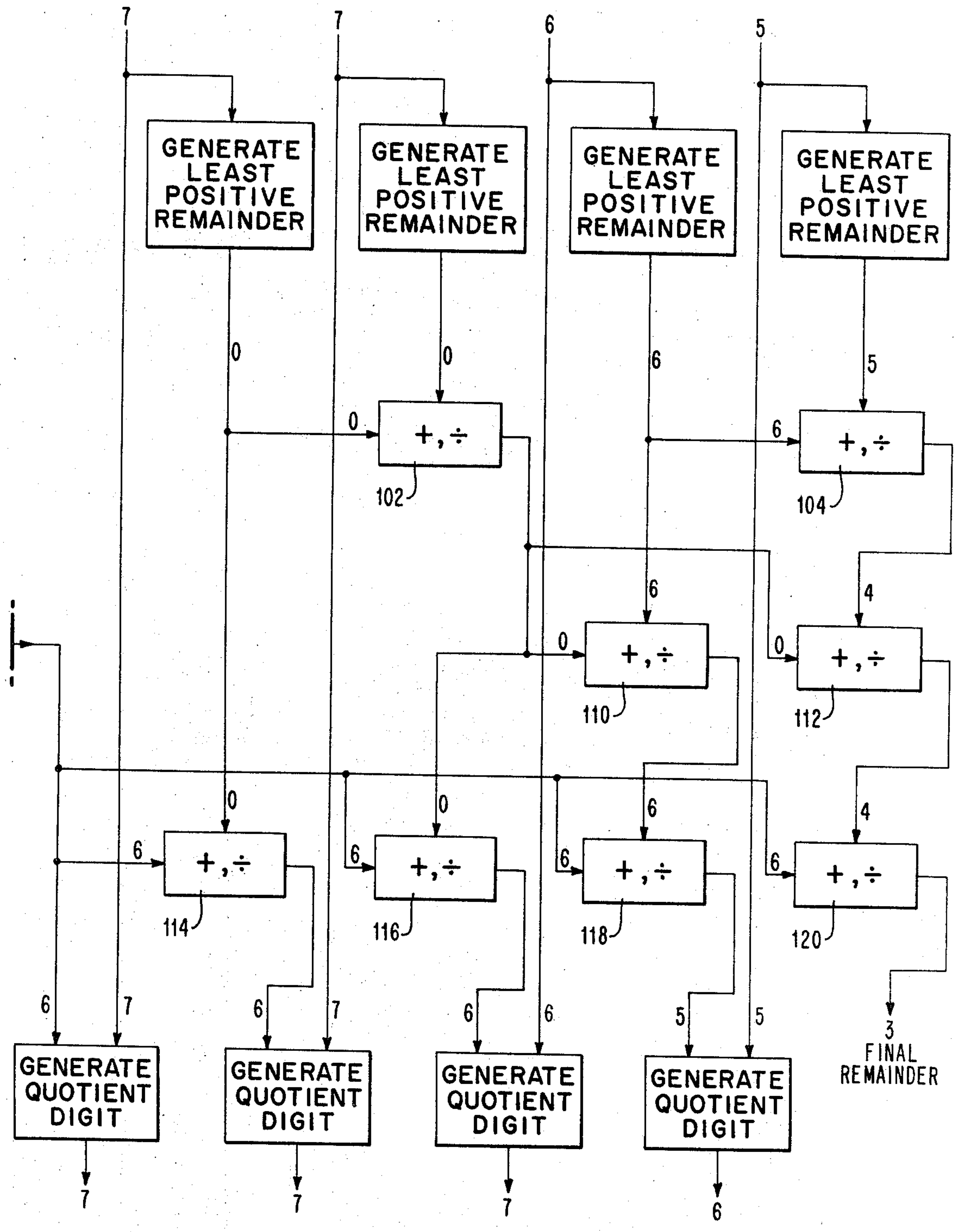

Considering now a different numerical example with the same fixed divisor of 7 but with a radix of 8 reference will be made to FIG. 10(A and B). It will be seen from the following description that a good deal of the remainder look ahead circuitry may be greatly simplified. Referring again to FIG. 7B, the factor by which the left hand input is multiplied in the multiplier 54, is the least positive remainder obtained when the radix is divided by the divisor. If this factor is one, as would be the case if the radix were 8 and the divisor 7 then the multiplier 54 disappears. The device 64 which casts out sevens is also simplified as there can be, at most, only one seven to cast out. Thus all devices such as 44 to 50 inclusive and 68 to 82 inclusive on FIG. 9 become identical and can be represented on FIG. 10 as devices 98 to 120 inclusive. FIG. 10 shows how the octal number 00067765 is divided by 7 to produce the octal number 00007776 and 3/7. The intermediate remainders are produced in a manner quite similar to the example of FIG. 9, it being remembered that no multiplication is necessary and that, at most, only one seven need be cast out. To generate the quotient digit, it must be noted that the two digit number in each column is an octal number. For example, the octal number 67 represents $(6\times8)+7$ or 55 in decimal and that this number contains seven sevens (49).

Similarly, the octal number 55 is equivalent to a decimal 45 $(5\times8+5)$ which when divided by seven (7) produces an integer quotient of six (6). The operation of FIG. 10 is believed to be obvious from the preceding description of FIG. 9 and the indication of all the numerical inputs to and outputs from the various functional blocks.

Figure 7C:
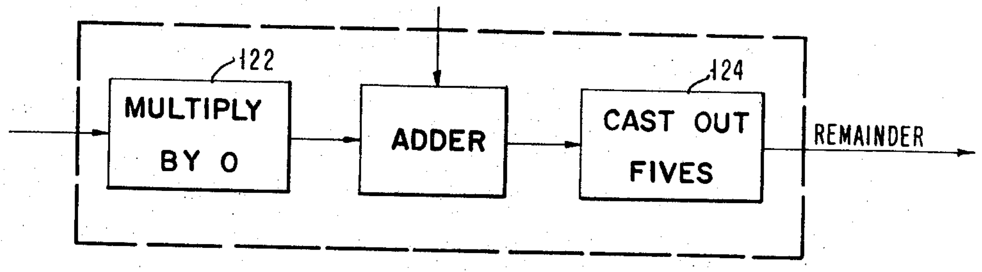
FIG. 7 is a functional block diagram of an alternative embodiment of FIG. 7B with a radix of 10 and a divisor of 5.
FIG. 7D is a functional block diagram of the boxes 124 on FIGS. 12A and 12B.
Figure 11:
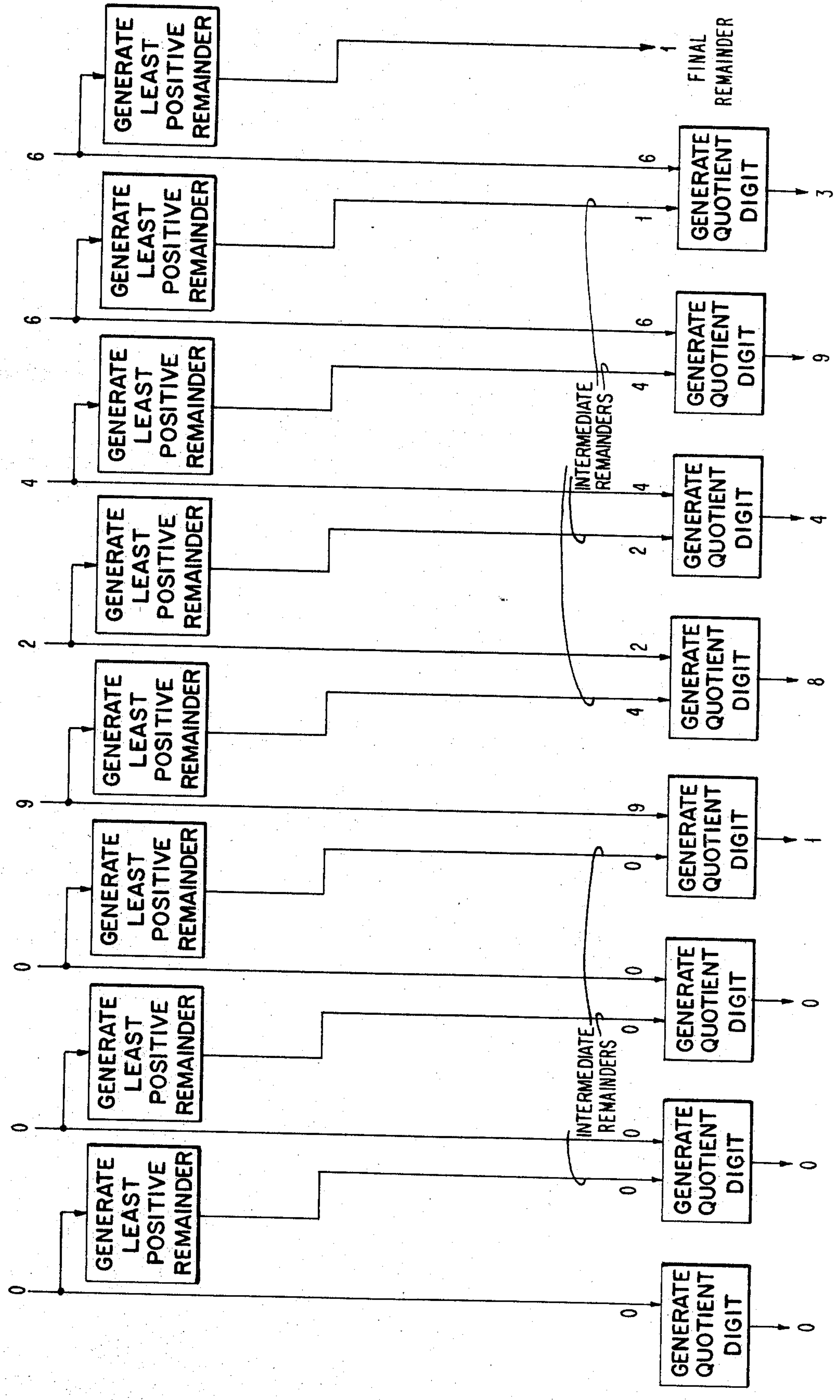
FIG. 11 comprises a combined flow chart and numerical example utilizing a dividend of radix 10 and a fixed divisor of 5.

A further simplification of the remainder look ahead circuitry occurs for the example of FIG. 11 wherein the dividend is expressed in radix 10 (decimal) and a fixed divisor of 5 is used. If FIG. 7B were redrawn for this example, it would appear as illustrated functionally in FIG. 7C.

The multiplication factor is zero because when 10 is divided by 5 the remainder is zero. The multiplier 122 and the left input thus disappear. The divider 124 is not necessary because all possible fives have been cast out of the top input. Devices such as 44 and 98 on FIGS. 9 and 10 disappear entirely. Such a divider with radix 10 and divisor 5 is shown on FIG. 11. Another way to divide by 5 in the decimal system would be to double the dividend and column shift one place to the right. The low order digit is thus halved to produce the final remainder. For example, the dividend 92466 (FIG. 11) when doubled becomes 184932. When column shifted, this becomes 18493 and 2/10 which equals 18493 and 1/5.

Figure 12B:
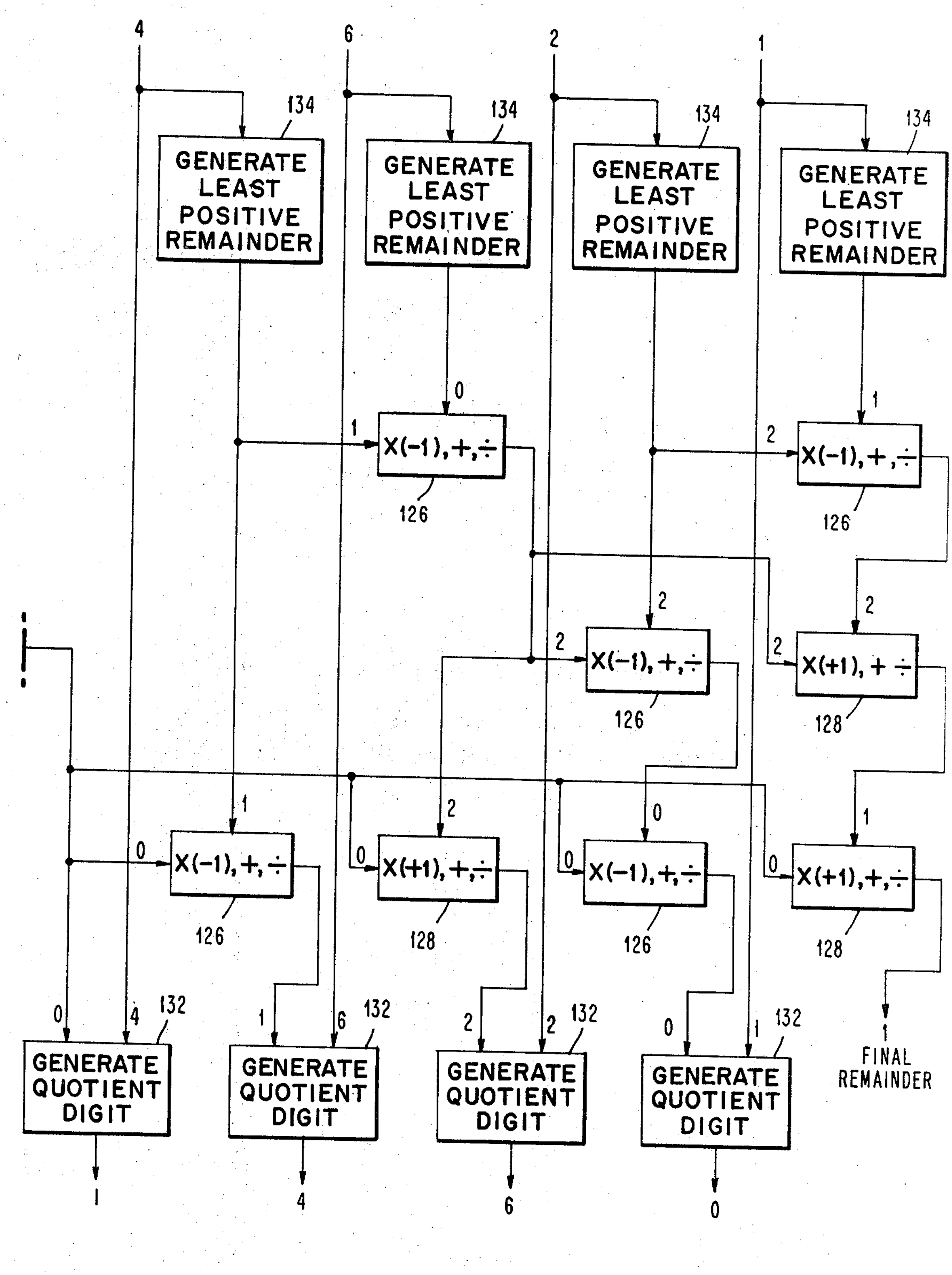

FIG. 12 illustrates a preferred embodiment example wherein the radix is 8 (octal) and the fixed divisor is 3. This is believed to represent a preferred utilization of the present invention and is the one detailed in the present embodiment disclosed in FIGS. 1–6. This is because octal digits are already present in standard binary format by dividing the dividend into three bit bytes beginning with the radix point.

Figure 7D:
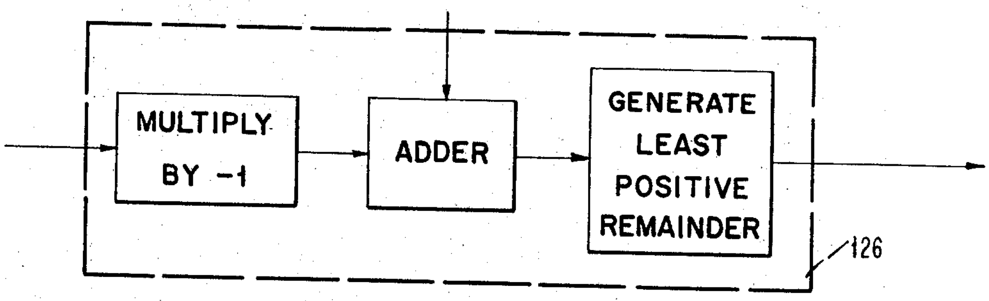

Referring again to FIG. 7B, it will be remembered that the multiplication factor was defined as the least positive remainder when the radix is divided by the divisor. In this case where the radix is 8 and the divisor 3, this multiplication factor is 2. (There are two threes contained in 8 with a remainder of 2). Because the divisor is 3, −1 can be substituted for 2. (If an additional 3 is subtracted from 2, the result is −1.) The device of FIG. 7B can be replaced by the device of FIG. 7D which performs the same function for the different radix, i.e. 8 and fixed divisor 3.

This overall device is represented by the reference character 126 as shown on FIG. 12. For the example illustrated in FIG. 12 where the octal number 57534621 is divided by 3 to give the octal number 17711460 and 1/3, eight of the devices 126 are required. It will be noted that the adder portion of device 126 is an algebraic adder and its output can be negative as well as positive. The inputs to the device 126 can never be greater than 2. If the output of the adder is positive, then this output is automatically the least positive remainder. If the output of the adder is negative, then a three must be added to it in order to obtain the least positive remainder. A truth table for device 126 is shown in FIG. 8A. It will be remembered that when the left hand input to a device such as 126 spans two columns the multiplication factor is squared. Thus the −1 in device 126 squared becomes +1. When three columns are spanned the multiplication factor becomes −1 again. (−1 raised to the third power is −1.) When four columns are spanned, the multiplication factor becomes +1. (−1 raised to the fourth power is +1.) There are thus additional devices shown on FIG. 12 where the multiplication factor is +1 and these are denoted by the reference character 128. A truth table for the devices 128 is shown in FIG. 8B.

The generation of the intermediate remainders for the example illustrated in FIG. 12 can be easily understood by using the truth tables for devices 126 and 128. To generate the quotient digits (integers), the device 130 and the device 132 are used. The truth table for device 130 is shown on FIG. 8C.

The truth table for the device 132 is shown on FIG. 8D. All of the numbers in all of the truth tables are octal numbers.

Returning now to FIG. 1, an overall generalized block diagram of a high speed fixed divisor divider for any desired radix as shown. The upper block entitled "Input Register" is as the name implies merely the storage location for inputting the dividend. The block marked "Remainder Generating Circuitry" (Modolo X) encompasses all of the remainder look ahead circuitry such as described with relation to FIGS. 9 through 12. Obviously, the contents of this box would vary markedly depending upon the radix used and the fixed divisor. Thus, the boxes marked "Generate Least Positive Remainder" on FIGS. 9 through 11 would as the name implies cast out all multiples of the fixed divisor present in the input divident digit and provide a remainder the maximum size of which would be determined by a maximum remainder when multiples of the fixed divisor are extracted from the radix. Thus, with the example of FIG. 12 with a divisor of 3 and the radix of 8, the maximum possible remainder is 2.

To divide by some other number which is a power of 2 multiple of the fixed divisor, i.e. 3, it will be readily understood that the divident or quotient could be shifted appropriately. Thus if it were desired to divide by 6 (2×3) the dividend would be right shifted one bit position and gated into the input register of the present divider where it would be divided by 3. The bit to the right of the radix point is the remainder of the division by 2 ($R_2$) the total remainder for the division by 6 ($R_6$) would be determined as follows: $R_6=2R_3+R_2$. Similarly, to divide by 12 (4×3) a right shift of of two bit positions would precede the division by 3.

Figure 2A:
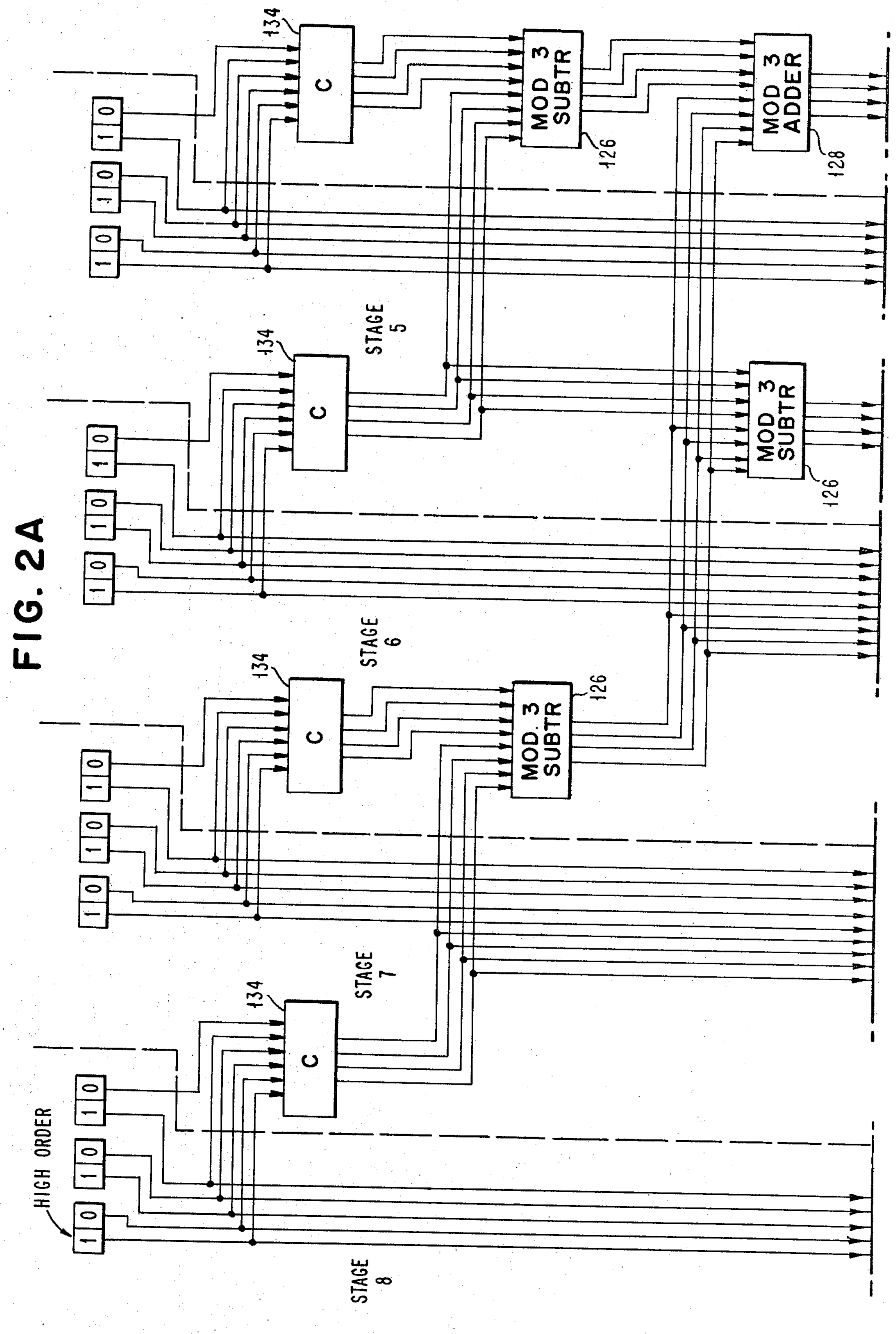
FIGS. 2A–2D constitute a more detailed functional block diagram of the preferred embodiment of the system illustrated generally in FIG. 1.
Figure 2B:
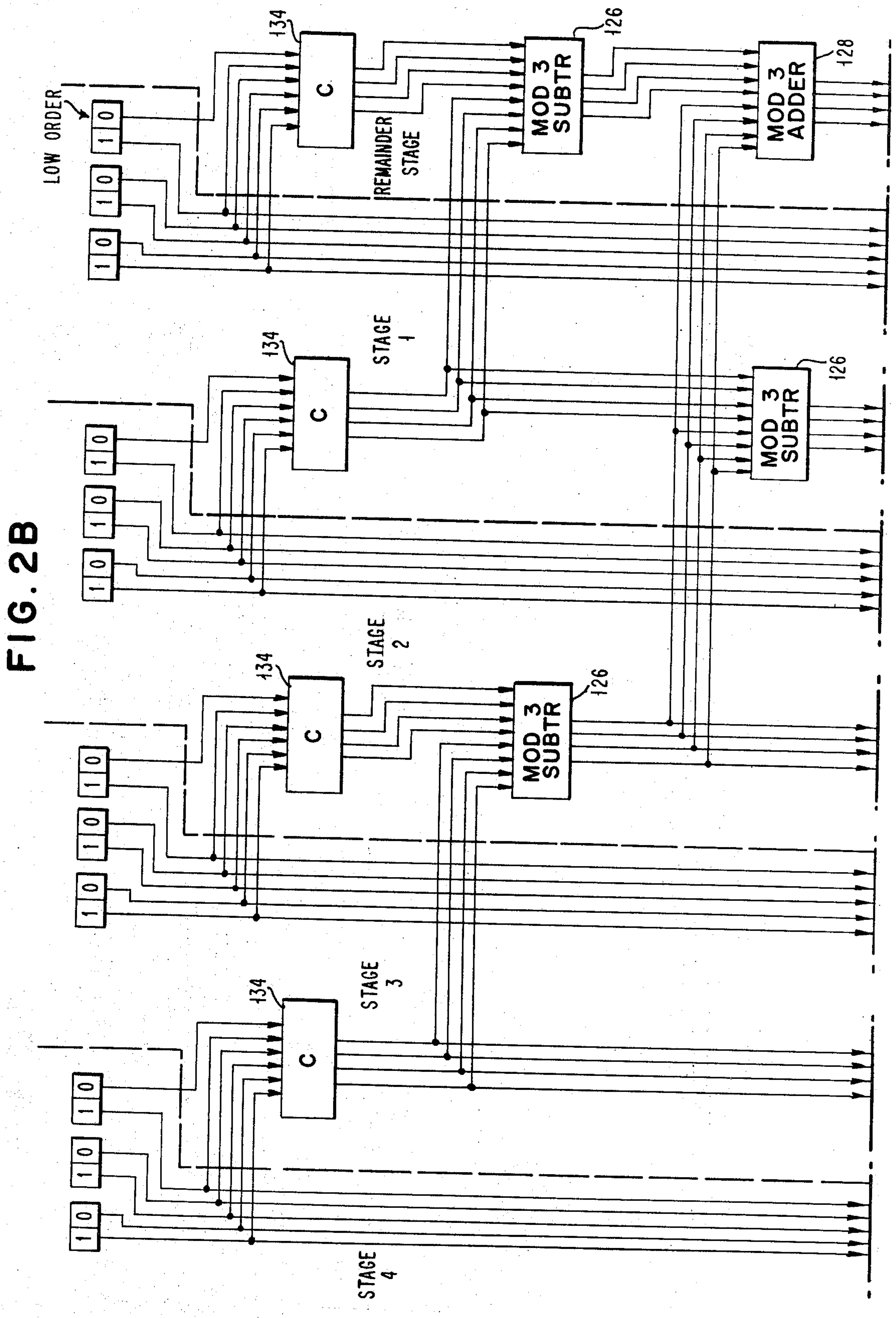
Figure 2C:
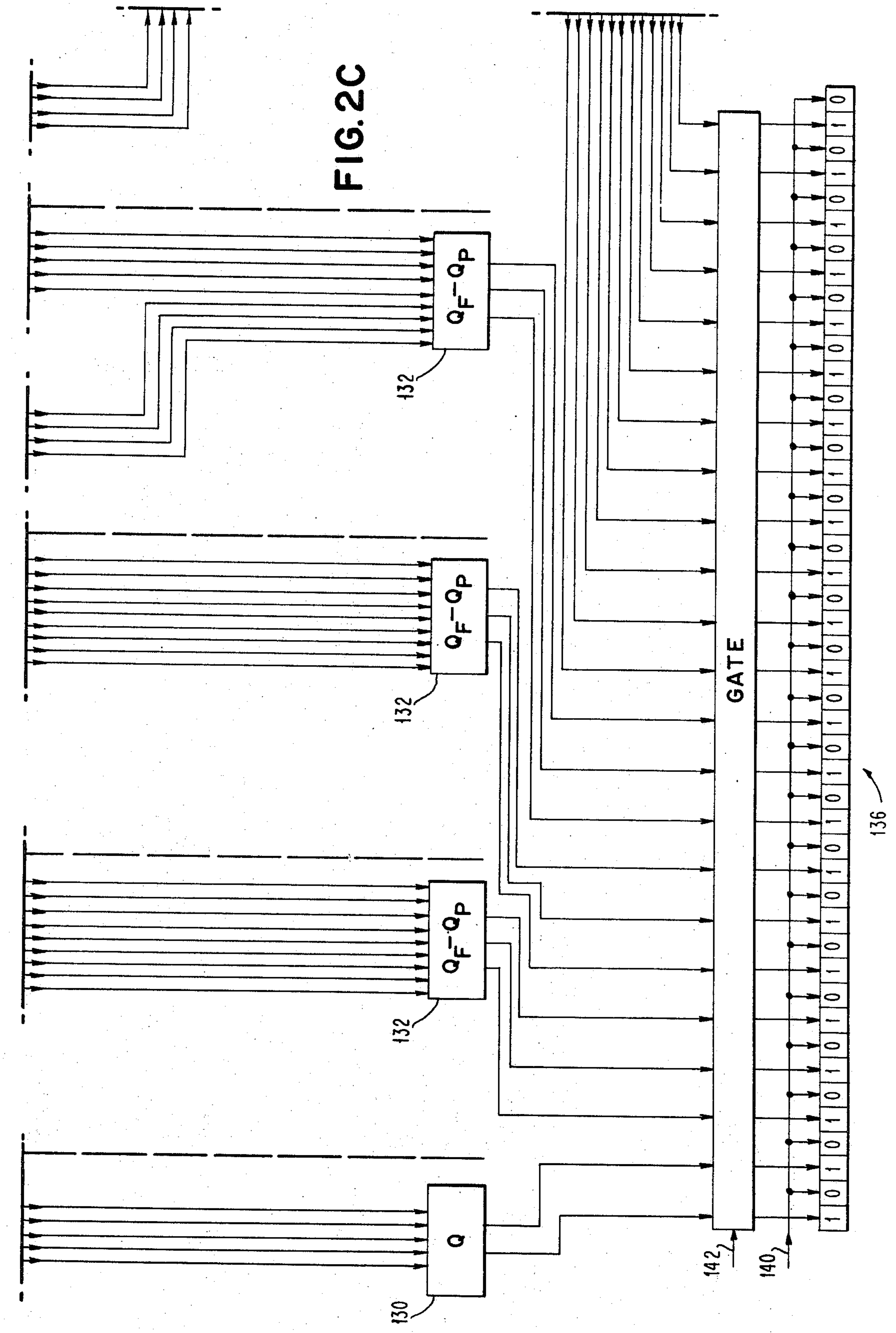
Figures 2, 2D:
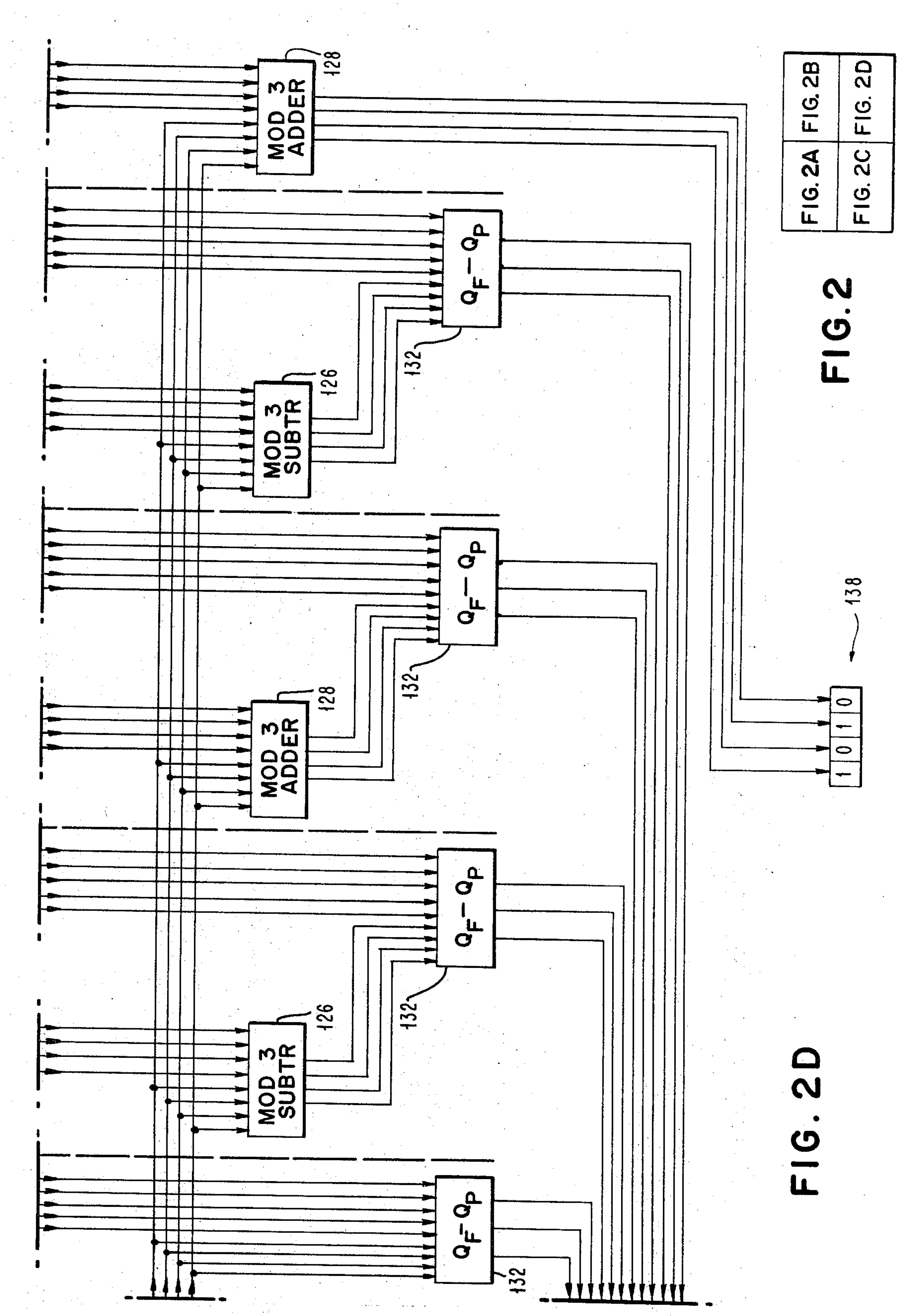
FIG. 2 is an organizational diagram of FIGS. 2A–2D.

Similarly, the contents of the multiplier-adder-Modulo divider boxes, such as exemplified by boxes 126 and 128 of FIG. 12 and FIG. 2 will vary considerably based upon the consideration required by the fixed divisor and radix chosen. However, the previous description of the numerical examples set forth in FIGS. 9 through 12 is sufficient to enable one skilled in the art to design such blocks for any radix or fixed divisor. It should be remembered that for any stage or column producing a final quotient digit a remainder input representing at least one input from all higher order stages must be evolved and combined with the divident digit for that stage in an appropriate adder-divider (with integer output only) such as 130 and 132 of FIGS. 12(A and B) and FIG. 2 (A–E). The block in FIG. 1 marked Adder/Divider (by X) Integer Output represents the aforementioned adder/divider functional units such as 130 and 132 of FIG. 12. It will be noted that this block receives a direct input from the Input Register and also from the Remainder Generating Circuitry block as set forth previously. The output of the Adder/Divider unit goes to the output registers indicated on FIG. 1 as the Integer Result. The second output from the Remainder Generating Circuitry goes into the Remainder Output Register indicated by the block labelled Remainder.

FIG. 2 represents a functional block diagram for a radix 8 fixed divisor 3 division system of the type shown on the flow chart and numerical example of FIG. 12. It will be noted that the Input Register at the top of the system is capable of storing 24 binary bits and that these bits are broken up in 8 24 binary bits and that these bits are broken up in 8 three bit bytes, each byte providing the divident input for each of the stages 1 through 8 going from low to high order. Each of these stages are shown and separated by a dotted line and include the circuitry necessary to produce an actual quotient digit from the divident digit and the accumulated remainder input for that stage. It will be noted that there is an additional stage marked Remainder Stage at the right hand portion of the figures which includes of the logic necessary for combining potential remainders from all of the eight dividend digits to produce a resultant or final remainder.

As stated previously, the circuit content of FIG. 2 is the exact duplicate of that of FIG. 12 with the additional showing of bit cables, registers, etc. It will be noted that the blocks 126 on FIG. 2 are the same functionally as the similarly numbered blocks on FIG. 12. The box marked MOD 3 SUBTR in effect multiplies the left hand input by minus one (−1) and performs an algebraic addition while the box marked MOD 3 ADDER performs a simple addition to the right and left hand inputs. As will be apparent, these are the same functions described for the same boxes in FIG. 12.

Figure 3:
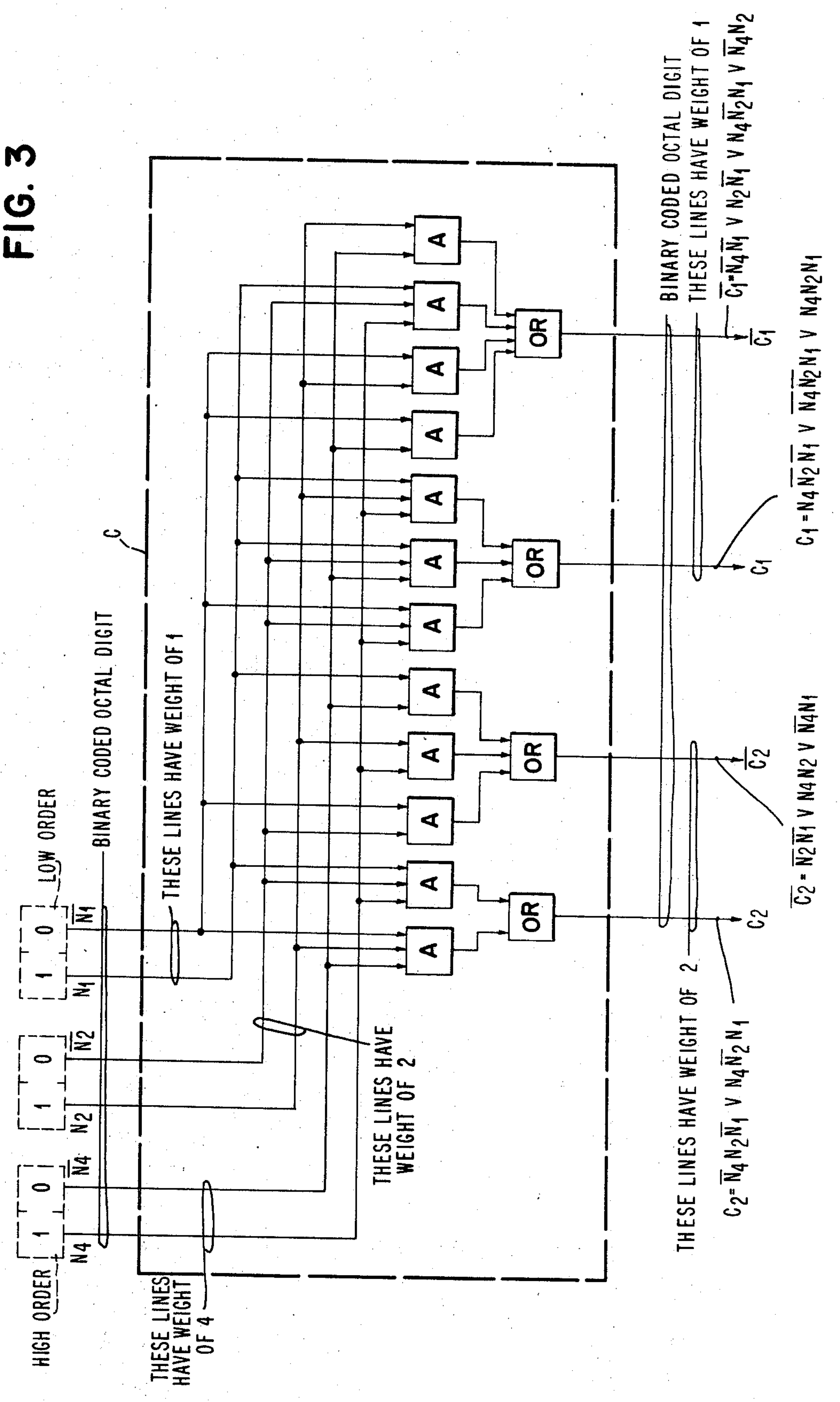
FIG. 3 is a logical schematic diagram of the C box as shown in FIGS. 2A–2D.

The contents of the various functional blocks on FIG. 2 are disclosed in FIGS. 3 through 6B. The devices labelled C on FIG. 2 are the same as the devices 134 on FIG. 12. These devices must perform essentially a division function in that they cast out multiples of the fixed divisor (in this case 3) and produces an output of the least positive remainder. The detailed logic for these devices is shown in FIG. 3. The output lines of the C device labelled $C_2$, $\overline{C_2}$, $C_1$ and $\overline{C_1}$ become the top left rand inputs to the devices 126 and 128. In stage 7 the output from the C box for that stage becomes the direct left hand input to the $Q_f$–$Q_p$ box 132. This is because there is only one higher order digit to be considered and thus only one possible input. The C box is composed of a series of AND and OR gates. It will also be noted in this figure, as well as FIGS. 4, 5, 6A and 6B, that detailed logical equations are given for the various output lines for all of these devices and also, an indication of the binary and octal weights given to various input and output lines is shown for the sake of clarity and simplicity of understanding.

Figure 4:
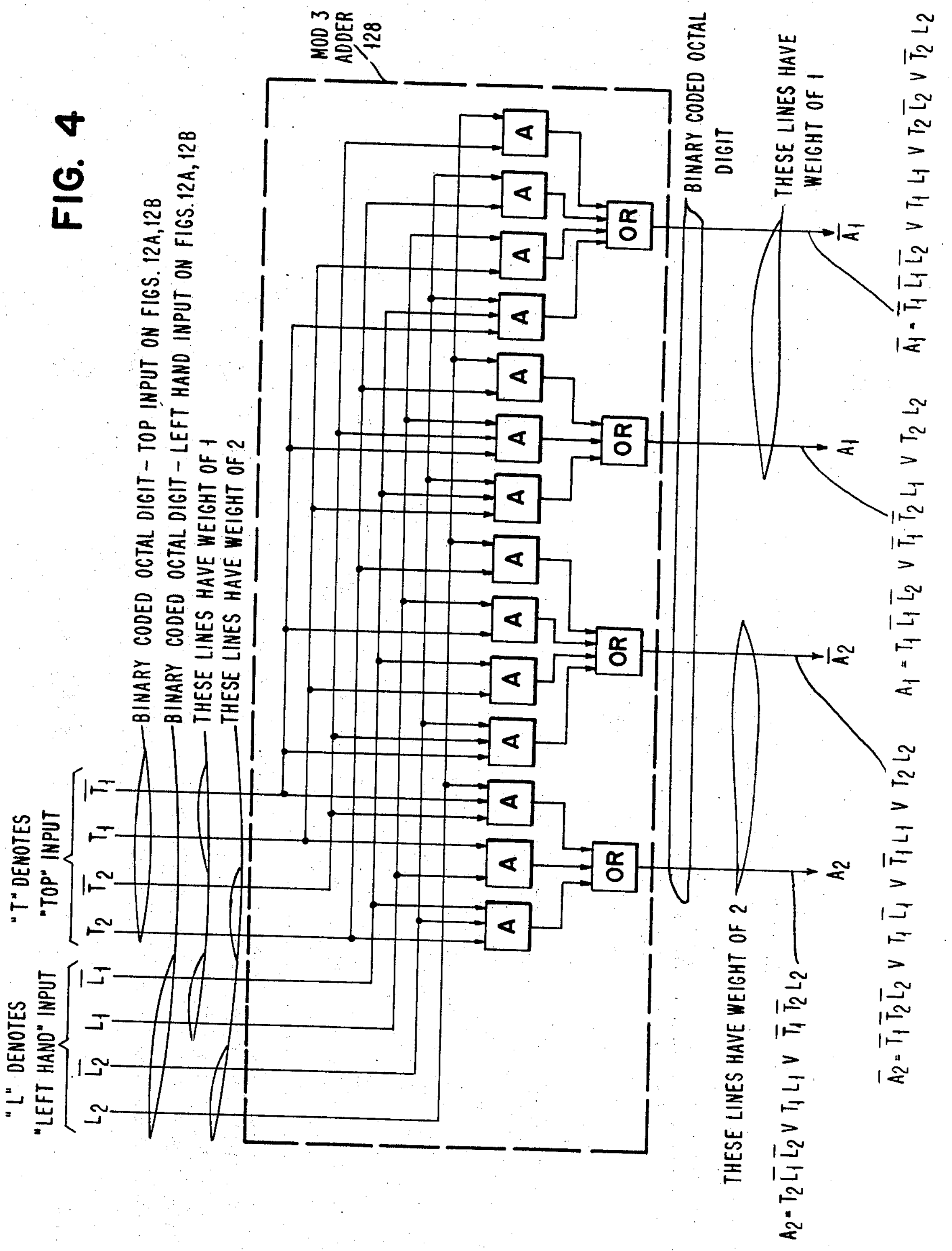
FIG. 4 is a detailed logical schematic diagram of a Modulo 3 Adder as shown on FIGS. 2A–2D.
Figure 5:
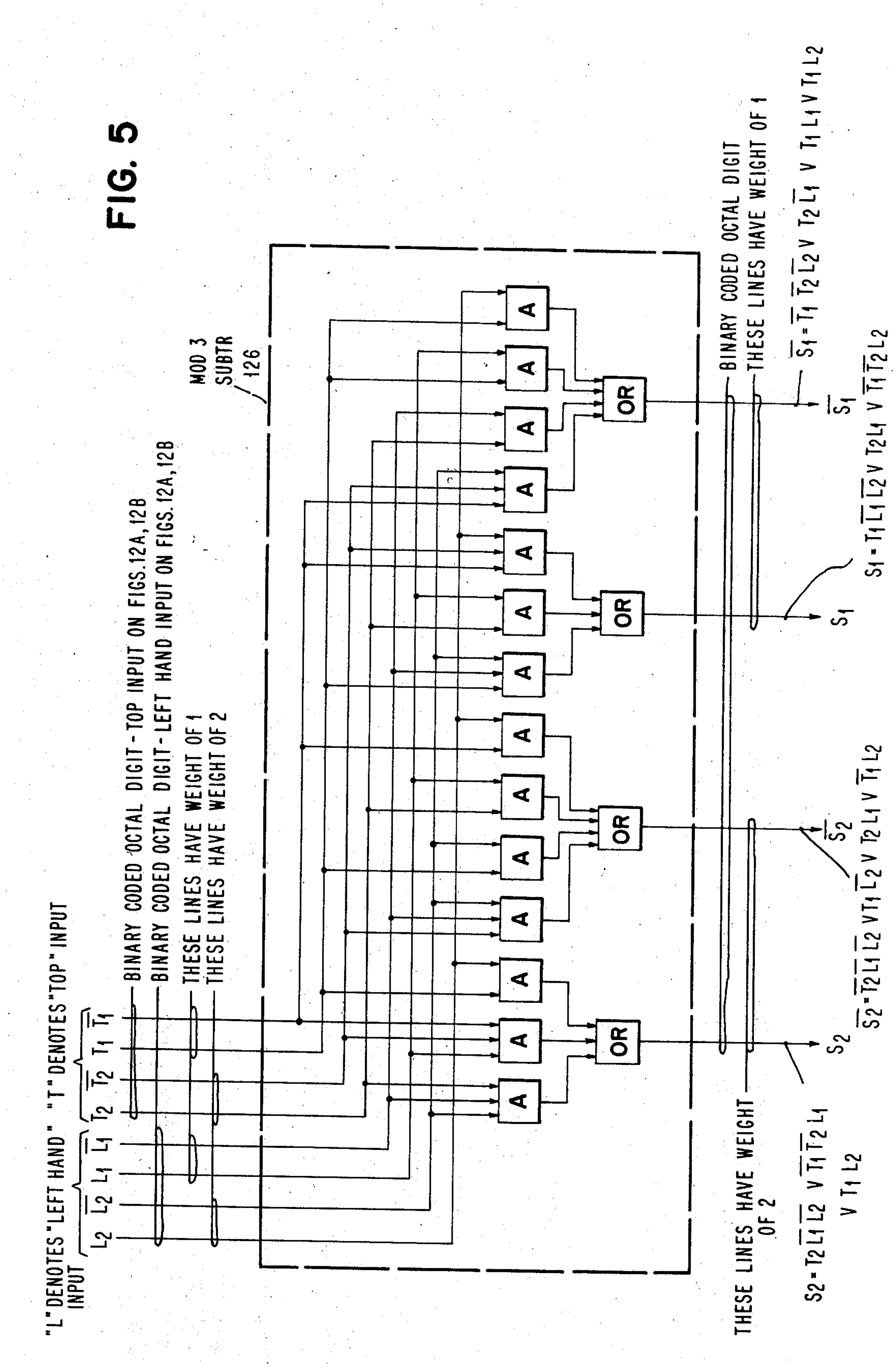
FIG. 5 is a logical schematic diagram of a Modulo 3 Subtracter as shown on FIGS. 2A–2D.

FIG. 4 comprises a logical schematic diagram of the Modulo 3 Adders 128 of both FIGS. 2 and 12. The various inputs marked as T and L indicate the four top right inputs and the four top left inputs respectively as shown to each of these blocks 128 on FIG. 2. Again, the logic of these blocks is shown in conventional AND/OR logic block format. The logic for these blocks is quite straight forward. The logical equations for each line again being shown on the figure for simplicity. The outputs labelled A on FIG. 4 proceed to other functional blocks in the system as indicated in FIG. 2. FIG. 5 comprises a logical schematic diagram of the blocks 126 labelled Modulo 3 Subtractors on FIG. 2. As in FIG. 4 the inputs to this block are labelled T and L and are the four top right and the four top left inputs respectively as shown on FIG. 2. The outputs labelled S go to other functional units again as indicated on FIG. 2.

Figure 6A:
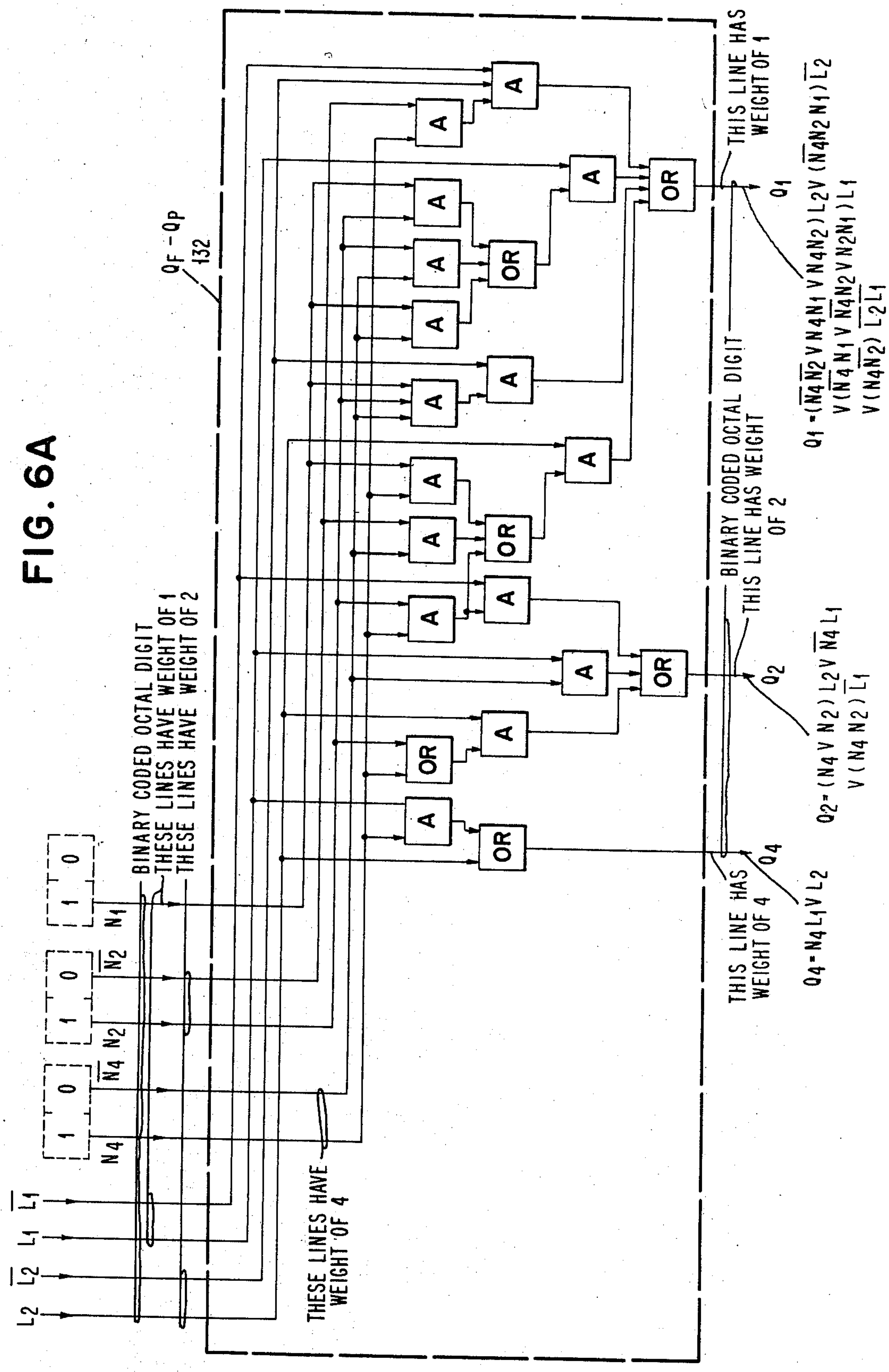
FIG. 6A is a logical schematic diagram of the boxes marked $Q_r$–$Q_p$ on FIGS. 2C and 2D.

FIG. 6A is a logical schematic diagram of the contents of the blocks labelled $Q_f$–$Q_p$ and designated by the numeral 132 on FIGS. 2 and 12. As with the functional devices illustrated in FIGS. 3, 4, and 5, this block is similarly embodied in conventional AND and OR gate logical circuitry. It will be noted that the right hand input to these blocks comes directly from the input registers as denoted on FIG. 6A and FIG. 2 and that the left hand inputs marked L come from either the blocks 124, 126 or 128 as clearly indicated on FIG. 2. It will be noted that there are only 3 output lines from each of the devices 132. One of these lines becomes active only when a binary one is desired thereon. The logical equation for setting any of the 3 output lines is clearly shown on FIG. 6A. However, because only the quotient "ones" (binary) are produced, it is first necessary to reset the register 136 to all zeros by applying a pulse to line 40. After this has been accomplished, a pulse can be applied to line 142 to gate the quotient from all the devices 130 and 132 into the register 136.

Figure 6B:
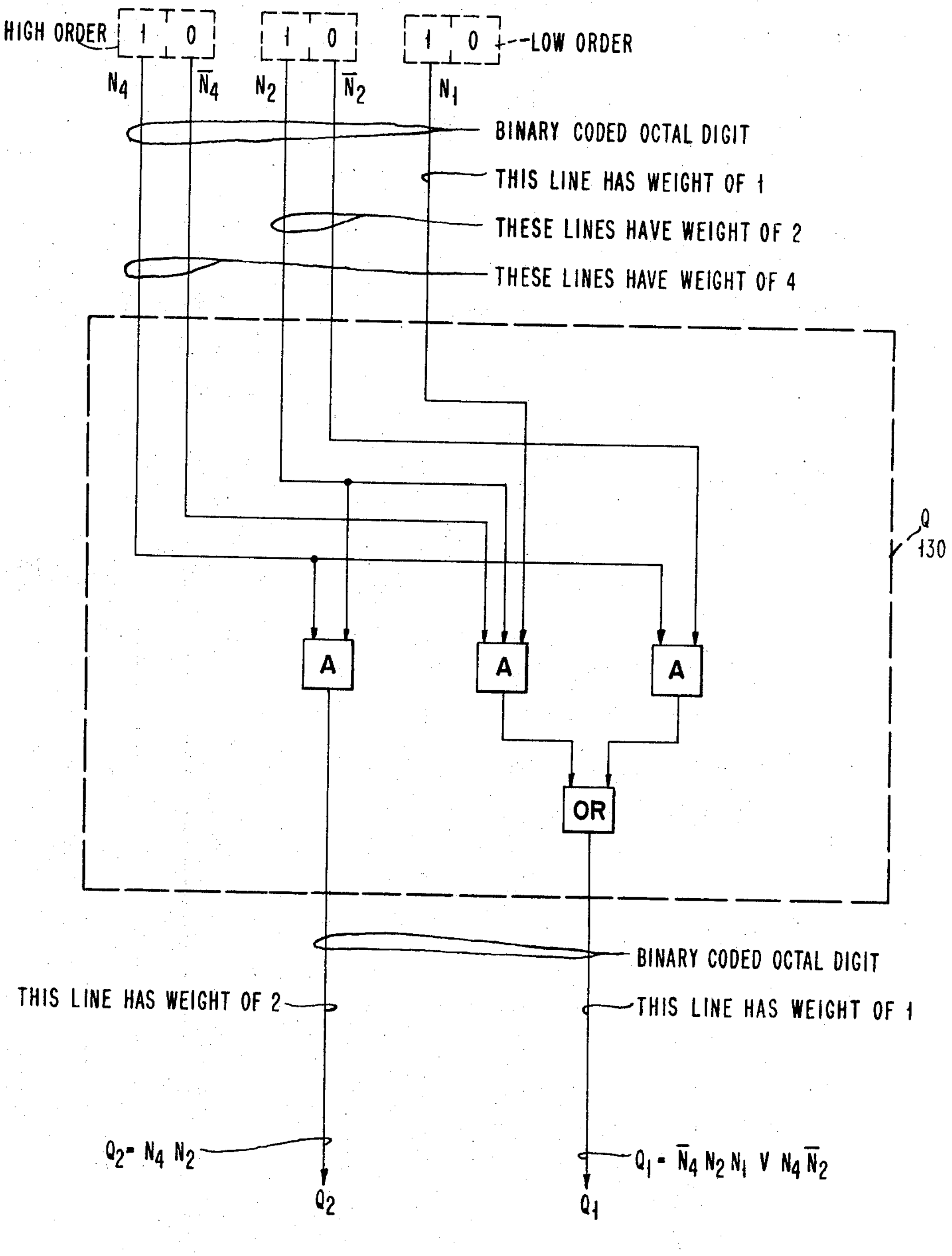
FIG. 6B is a logical schematic diagram of the Q box shown on FIG. 2C.

FIG. 6B is a logical schematic diagram of the Q box 130 on FIGS. 2 and 12. As will be apparent from inspection at this figure, this box is a simple divider and produces the integer quantity as a quotient resulting from dividing the high order dividend digit by the fixed divisor, in this case, 3. The contents of the block are believed to be fully explanatory since the input is the high order three digits of the dividend and the output whose logical equations are shown in the figure appear on the two lines marked Q.

The operation of the system of FIG. 2 is exactly the same as that for FIG. 12. It will be noted by examining the functional diagram of the FIG. 2 that a good deal of parallelism has been built into the disclosed embodiment in order to save considerable time in the ultimate remainder look-ahead circuitry. For example, in stage 4 the Mod 3 Adder could be completely eliminated and the Mod 3 Subtractor receive its right hand input from the C box and its left hand input directly from the output from the Mod 3 Subtractor of stage 3. This would give the same result but would obviously require an additional time level as will be apparent. Thus, each stage could be reduced simply to a single C box and a single Modulo 3 Subtractor if economy of hardware were the sole criteria. If, on the other hand, it is acceptable to sacrifice some hardware in order to gain time a more highly parallel system such as disclosed in FIGS. 2 and 12 may be utilized.

CONCLUSIONS

It is believed that the preceding description of the preferred embodiments of the invention as set forth in FIG. 2 should clearly describe the operation of the disclosed embodiment. Further, by applying the teachings of this embodiment to the additional numerical examples utilizing different radices and divisors, it would be obvious to anyone skilled in the art to construct a high speed divider embodying the principles of the present invention. As one final example, a system using a binary dividend and a divisor of 5 may be briefly outlined. For such a system it would be convenient to separate the dividend into groups of 4 bits each, thus, in effect, creating a radix of 16. The least positive remainder when 16 is divided by 5 is one and therefore the multiplier 54 in devices, such as that of FIG. 7B, disappear and the devices such as 126 and 128 on FIG. 12 become identical, i.e. simple adders. The construction of suitable truth tables and logic for the different devices of such a system would be obvious.

For any particular application, the radix system chosen and the number of dividend bits spanned by the remainder generating devices should be chosen to enable an efficient use of the logic families available. Thus, for the conventional binary data systems of most present day computers, radices of 8, 16, 32, etc. would be most convenient. While the fixed divisor may be dictated by other considerations wherever possible it is most convenient to use numbers such as 3, 5, etc. with appropriate radix systems such that the input multiplication factor may conveniently be reduced to a plus or minus one with attendant great simplification in the logic unit required.

Also, as stated previously, the present division system can be utilized together with conventional shift registers to obtain division by power of two multiples of the fixed divisor e.g. 6 ($2\times3$) and 12 ($4\times3$).

As stated previously, it will be obvious from an inspection of FIG. 2 that a number of extra logic levels or functional blocks are provided in the lower four level stages to achieve a considerably greater degree of parallelism in the generation of the complete remainders rippled down from higher order stages. In the disclosed embodiment remainders from the four higher order stages, i.e., the output from the Modulo 3 Adder of stage 4 are fed directly or in parallel to the four lower stages 3, 2, 1 and remainder stage. Thus, the generation of the remainders for the lower order stages may proceed in parallel with the generation for the higher order stages. Obviously, a greater or lesser degree of parallelism can be built into the circuitry depending on speed desired and the of hardware the designer is willing to commit to the speed-up function.

While the detailed embodiment of the various logical elements such as the AND and OR gates as disclosed on FIGS. 3–6B are not specifically set forth, it will be understood that these elements may readily be constructed in standard tube, semiconductor or semiconductor monolithic circuit technologies without departing from the spirit and scope of the present invention.

Utilizing the teachings of the presents invention, a radix 8 fixed divisor 3 division system constructed in accordance with the teachings of the present invention would normally be capable of producing the final quotient and remainder in about one twentieth of the time required through use of a computer's general divide operation. This figure might be reduced somewhat if a fixed divisor were utilized with a conventional system utilizing a conventional division algorithm of determining high order quotient bits first and allowing individual remainders to ripple down to the next lower order stage.

A "ripple" divide by 3 circuit would involve from 2 to 3 times the delay of the circuit of FIG. 2 for 24 bit operands. Generally, the delay for the present divider is a log function of the operand length and hence has greater superiority for longer operands.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A high speed divider for producing a quotient and remainder when a multiple digit dividend of radix Z is divided by a fixed division X, said system comprising:

a quotient digit generating stage associated with each digit of said dividend, each quotient digit generating stage including a remainder generating portion and a divider, wherein each remainder generating portion has an effective input from every higher order portion as well as its own dividend digit and wherein the remainder output from each remainder generating portion is the effective intermediate remainder for that and all higher order stages, each said divider including means for generating an effective quotient integer digit comprising means for combining the original dividend digit associated with that stage with an effective remainder propagated from all higher order stages as determined by the remainder generating portion for the adjacent higher order stage, said highest order quotient digit generating stage comprising a divider capable of generating its quotient digit by dividing the highest order dividend digit by said fixed divisor.

2. A divider as set forth in claim 1 wherein said remainder generating portion for each generating stage includes means for extracting all possible multiples of the fixed divisor X from the combined remainders passed down from all higher order stages and its own dividend digit and includes means for producing a least positive or negative remainder therefrom less than X and for passing a least positive remainder to the divider portion of the adjacent lower order stage.

3. A high speed divider as set forth in claim 2 wherein each remainder generating portion further includes assimilation means for multiplying the remainder from a higher order stage by a factor determined by the formula: $k=[(Z\ modulo\ X)^y]$ modulo $X$ (least positive or negative remainder) where $y$=the displacement of the stage from which the higher order remainder is propagated; adding the result to the remainder determined by extraction or from another assimilation means in the same generating stage and removing multiples of X to produce the least positive or negative remainder.

4. A high speed divider as set forth in claim 3 wherein each remainder generating portion includes as many cascaded assimilation means as are necessary to assimilate all higher order remainders.

5. A high speed divider as set forth in claim 4 wherein said divider portion of a given stage includes means for combining the associated dividend digit and the intermediate remainder as determined by the output of the remainder generating portion of the adjacent higher order stage and dividing said combination by said fixed divisor and passing the integer portion of the quotient to a result register and casting out the remainder.

6. A high speed divider for producing a quotient and remainder when an N digit dividend of radix 8 is divided by a fixed divisor of 3, said system comprising:

N remainder generating stages for concurrently generating $N-1$ intermediate remainders and a final remainder wherein each remainder generating stage has an effective input from every higher order stage as well as its own individend digit and wherein the remainder output from each remainder generating stage is the effective intermediate remainder for that and all higher order stages, N dividers for producing up to N quotient digits, each said divider except that for the high order quotient digit including means for combining the corresponding dividend digit and the final intermediate remainder digit propagated from the adjacent higher order remainder generating stage and for dividing said combination by the fixed divisor 3 and for keeping only the integer portion of the result, wherein said high order quotient digit divider receives only the high order dividend digit as an input.

7. A high speed divider as set forth in claim 6 wherein each remainder generating stage includes a modulo 3 converter for extracting all multiples of 3 from its own dividend digit and producing the least positive remainder less than 3.

8. A high speed divider as set forth in claim 7 wherein each remainder generating stage except that stage associated with the highest order quotient digit contains at least one assimilation means comprising means for selectively adding to or subtracting from the remainder produced by either the modulo 3 conversion means for that stage or another assimilation means located in that stage a quantity representing a remainder produced by a higher order remainder generating stage displaced an even or odd number of stages from that stage respectively.

9. A high speed divider as set forth in claim 8 wherein said assimilation means further includes means for extracting multiples of 3 from the result of said addition or subtraction and for producing the least positive remainder less than 3.

10. A high speed divider as set forth in claim 9 wherein each said remainder generating stage includes as many cascaded assimilation means in addition to the modulo 3 conversion means as necesary to incorporate all remainder inputs from higher order remainder generating stages.

11. A high speed divider as set forth in claim 10 wherein each said divider except that for the high order quotient digit has an effective 2 digit dividend input wherein the low order digit comprises the corresponding actual dividend digit and the higher order digit is the output of the remainder generating stage associated with the adjacent higher order stage.

References Cited

UNITED STATES PATENTS

| | | | |
|---|---|---|---|
| 3,223,831 | 12/1965 | Holleran | 235—156 X |
| 3,293,418 | 12/1966 | Thornton | 235—156 |
| 3,344,261 | 9/1967 | Hornung | 235—160 |

MALCOLM A. MORRISON, Primary Examiner

C. E. ATKINSON, Assistant Primary

U.S. Cl. X.R.

235—156, 164